United States Patent [19]

Anderson et al.

[11] 4,277,023
[45] Jul. 7, 1981

[54] CENTER PIVOT IRRIGATION SYSTEM WITH CORNER WATERING ARRANGEMENT

[75] Inventors: John L. Anderson, Columbus, Nebr.; John C. Davidson, Alexandria, Minn.; Henry W. Schaaf, Madison; Charles H. Meis, Genoa, both of Nebr.

[73] Assignee: Lindsay Manufacturing Company, Lindsay, Nebr.

[21] Appl. No.: 801,099

[22] Filed: May 27, 1977

[51] Int. Cl.³ .............................................. B05B 3/12
[52] U.S. Cl. ...................................... 239/11; 239/177; 239/710
[58] Field of Search ................... 239/DIG. 1, 11, 177, 239/212, 99, 710; 137/344

[56] References Cited

U.S. PATENT DOCUMENTS

| 2,604,359 | 7/1952 | Zybach | 239/177 |
|---|---|---|---|
| 3,352,493 | 11/1967 | Curtis | 239/177 |
| 3,902,668 | 9/1975 | Daugherty et al. | 239/177 |
| 3,979,062 | 9/1976 | Christensen et al. | 239/11 |
| 4,011,990 | 3/1977 | Meis et al. | 239/11 X |
| 4,033,508 | 7/1977 | Jacobi et al. | 239/177 |
| 4,161,292 | 7/1979 | Holloway et al. | 239/177 |

*Primary Examiner*—Robert W. Saifer
*Attorney, Agent, or Firm*—Kinzer, Plyer, Dorn & McEachran

[57] ABSTRACT

This is concerned with a so-called center pivot irrigation system in which a string of pipe is supported on wheeled towers at intervals and pivots about a so-called center pivot or water supply either intermittently or continuously so that it waters or irrigates a generally circular area. This is more specifically concerned with an arrangement and a control for watering the corners or noncircular area of a field in a manner which is greatly simplified over a number of previous approaches.

11 Claims, 10 Drawing Figures

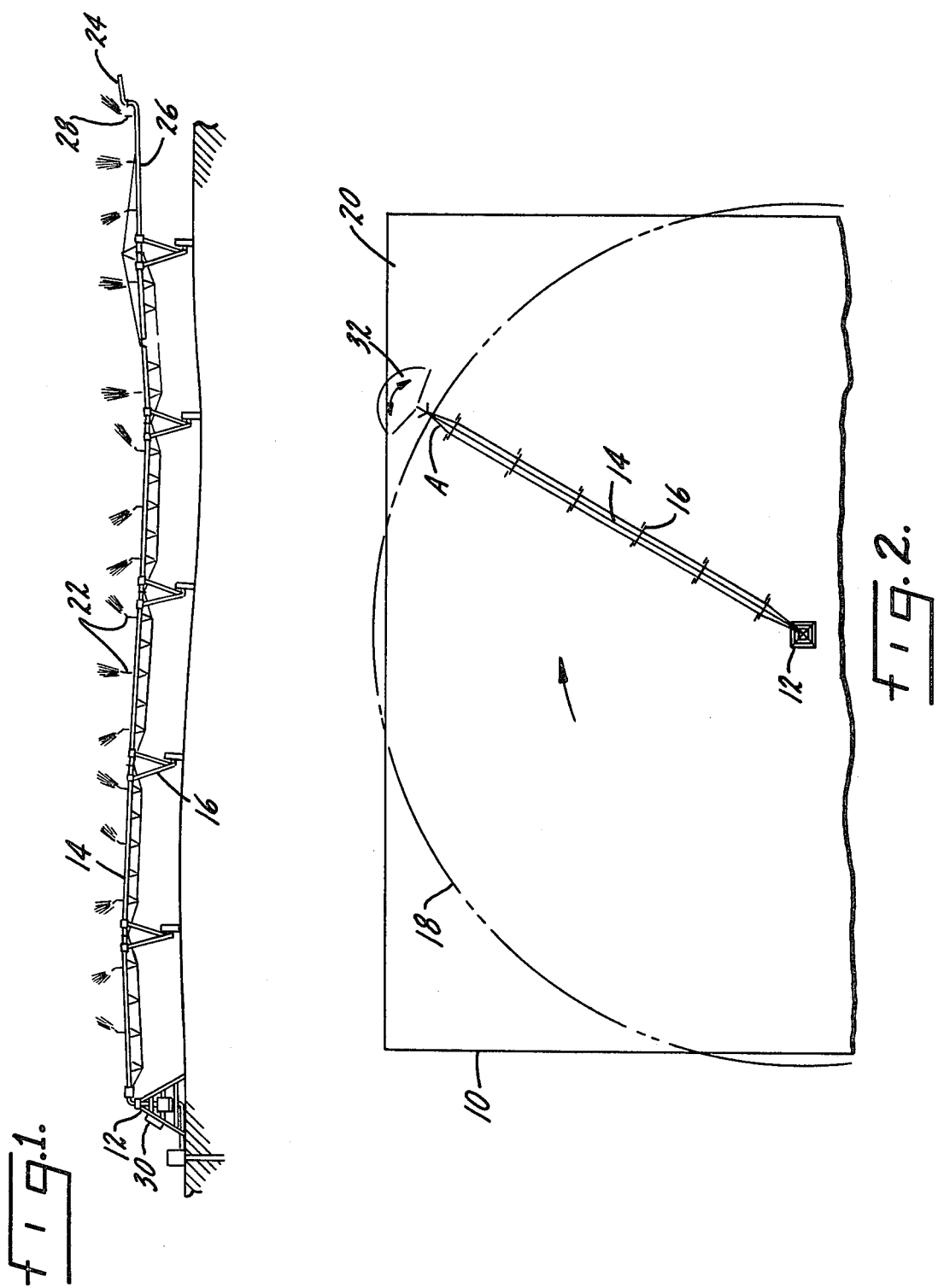

CENTER PIVOT IRRIGATION SYSTEM WITH CORNER WATERING ARRANGEMENT

SUMMARY OF THE INVENTION

This is concerned with a center pivot irrigation system and is more specifically directed to a corner watering arrangement.

A primary object of the invention is a method and apparatus for watering the corners of a field with a center pivot irrigation system.

Another object is a unit of the above type having an enlarged end gun which is cyclically controlled in a specific manner for watering the corners of a field.

Another object is a method of operating a center pivot irrigation system which insures uniform application of water, both in the main circle, as well as in the corners of a field.

Another object is a corner watering gun for a center pivot irrigation system with a control that insures a near uniform application of water to most of the corner area.

Another object is a method of operating a center pivot irrigation system with a corner watering gun on the end thereof that operates in a novel and unique manner.

Other objects will appear from time to time in the ensuing specification and drawings.

BRIEF DESCRIPTION OF THE DRAWINGS

FIG. 1 is a diagrammatic illustration of a typical center pivot irrigation system with a corner watering mechanism diagrammatically indicated thereon;

FIGS. 2-6 are diagrammatic illustrations of a number of operative positions of the mechanism of FIG. 1.

DESCRIPTION OF THE PREFERRED EMBODIMENTS

Figure 3:
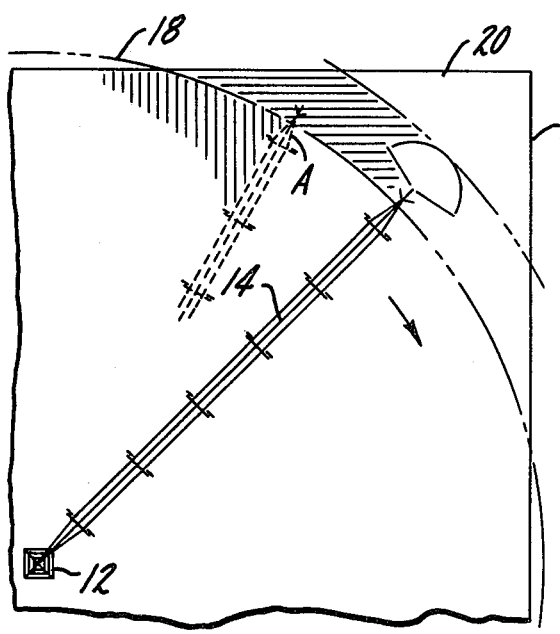

FIGS. 1 and 2 are diagrammatic views of a typical center pivot irrigation system in which a field, indicated generally at 10, of any suitable size, has a center pivot at 12 disposed generally in the center thereof, with a suitable pipeline extending outwardly therefrom, as at 14, supported at intervals by movable towers 16, each of which may be self-propelled or otherwise so that a generally circular area 18 is irrigated by the system. A circular system of this nature cannot irrigate the corners 20 of a square field, which amounts to a substantial loss in acreage, something on the order of 20 percent of the total. The pipeline itself may have a plurality of spaced sprinkler units 22 thereon at suitable intervals to irrigate the circular area 18.

To irrigate the corners 20, an enlarged end or corner gun, indicated diagrammatically at 24, is disposed on the outer end and may be mounted on the end of the normal overhang or extension 26 on the end or beyond the last tower.

The corner gun 24 is to be distinguished from the regular end guns 28 which are conventionally used on the end or overhang 26 of a center pivot system. Such normal end guns 28 have a very limited spray pattern and only project or cover, say, about 70 ft., beyond the end of the pipeline. In the arrangement shown, the enlarged or corner gun 24 is substantially larger in size and effectiveness and, under full pressure, is arranged and constructed to project water substantially farther into the corners 20, say, for example, 160 ft. beyond the end of the pipeline.

The arrangement has a control which will shut down the regular sprinklers 22 from time to time according to a certain program explained hereinafter. Each such sprinkler could have a control valve for this purpose. Or one solenoid valve might control individual hydraulic valves, for example water, at each of the sprinklers. The corner gun 24 should have a similar control, for example a control valve, so that it may be selectively turned off and on. Or it might be hydraulic. A control box 30 is shown at the center pivot for this purpose and while the details of a particular electric or control circuit have not been shown, it should be understood that the valves may be electrically or hydraulically or otherwise controlled and operated by limit switches at the center pivot which are opened or closed by a suitably contoured cam so that as the pipeline pivots, the operation of the regular sprinkler valves and enlarged corner gun may be suitably controlled according to a present pattern, all of which in detail may be conventional and is not important here.

The pattern or method of operation will be explained in connection with FIGS. 2-6 and it may be assumed that the normal direction of rotation of the center pivot is clockwise, as indicated by the arrow in FIG. 2. It will be noted in FIG. 2 that the center pivot has swung or moved past one side of the field and is approaching or entering the corner 20. At a suitable point, indicated at A, the control, be it at the center pivot or otherwise, will bring the pipeline to a stop. Then, all of the sprinklers 22 and the regular end guns 28 will be turned off. At or about the same time the corner gun 24 will be turned on and will sweep or pan through a certain pattern or arc 32 in FIG. 2 for a certain period of time, for example thirty minutes, with the pipeline stationary and inoperative.

Figure 4:
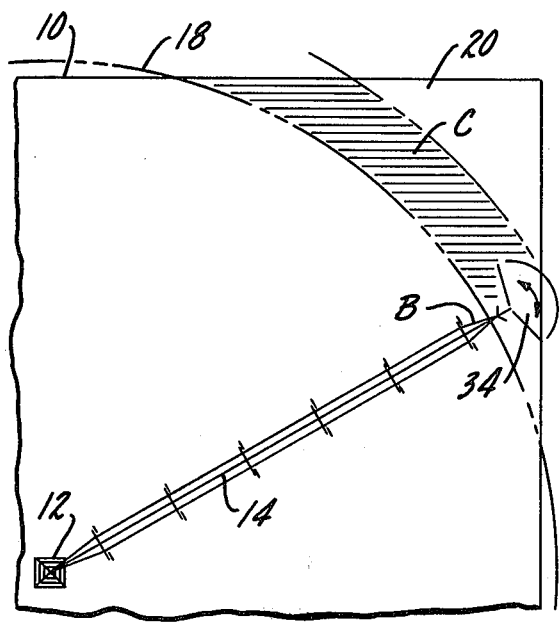

At the completion of this time period, whatever it is, the pipeline will start its forward movement, in a clockwise direction in FIG. 2, and will move past the corner, as shown in FIG. 3, to a suitable point B in FIG. 4 where it is leaving or just about to leave the corner. During this movement from point A to point B, the corner gun is energized and sweeping to irrigate area C, as shown by the pattern in FIG. 4. The regular sprinklers 22 on the pipeline remain deenergized. Thus during the stationary period of the pipeline, shown in FIG. 2 at point A with the corner gun sweeping, at 32, and also during the movement of the pipeline from point A in FIG. 2 to point B in FIG. 4, the full pressure of the water from the pump will be supplied to and effective at the corner gun 24, since the regular sprinklers and regular end guns 28 will be inoperative.

When the system arrives at point B, movement stops and the unit remains in this position for a certain period of time, for example thirty minutes, with the corner gun 24 sweeping through an arc 34 which may be the same as the initial arc 32, shown in FIG. 2. During this dwell period at point B, the normal sprinklers and normal end guns are deenergized so that the full water pressure is supplied to the corner gun.

Figure 5:
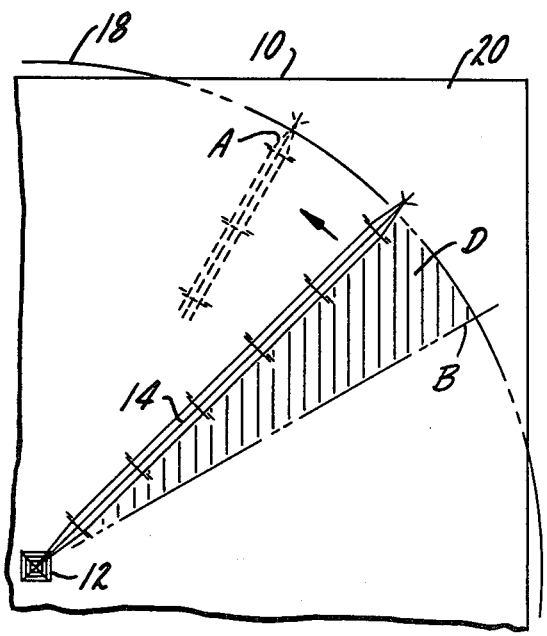
Figure 6:
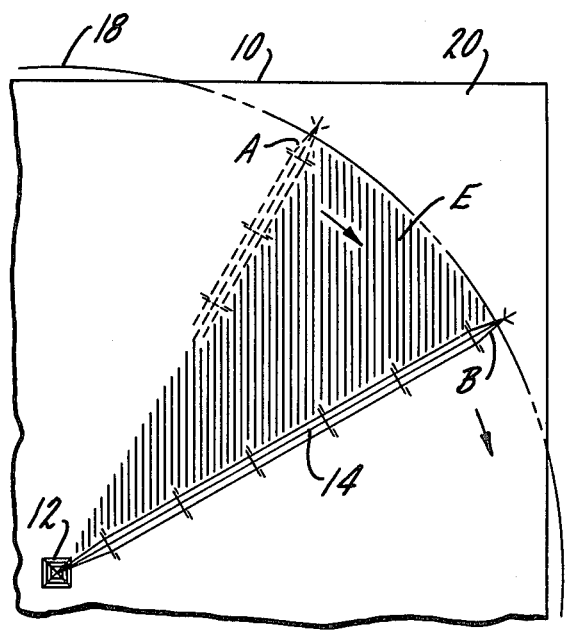
Figure 7:
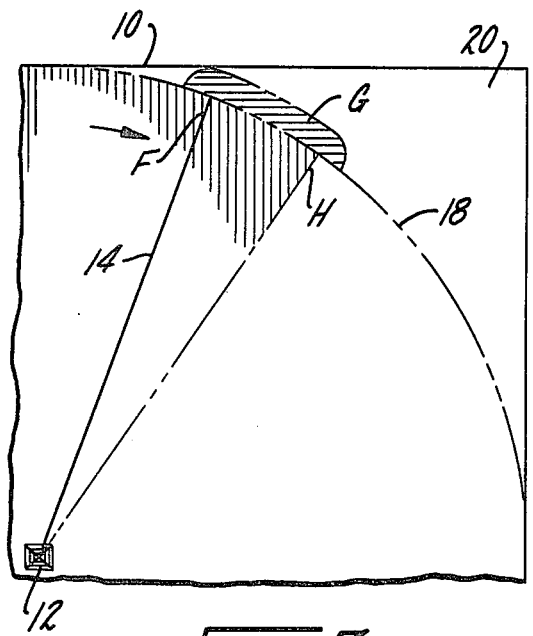
FIGS. 7-10 are diagrammatic illustrations of a variant form.
Figure 8:
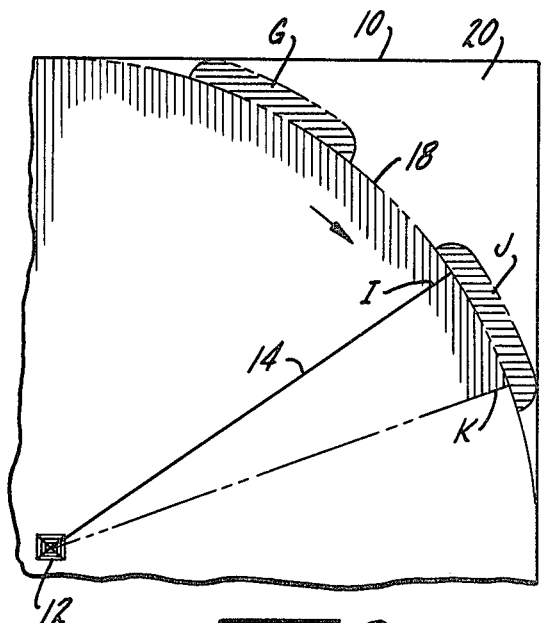
Figure 9:
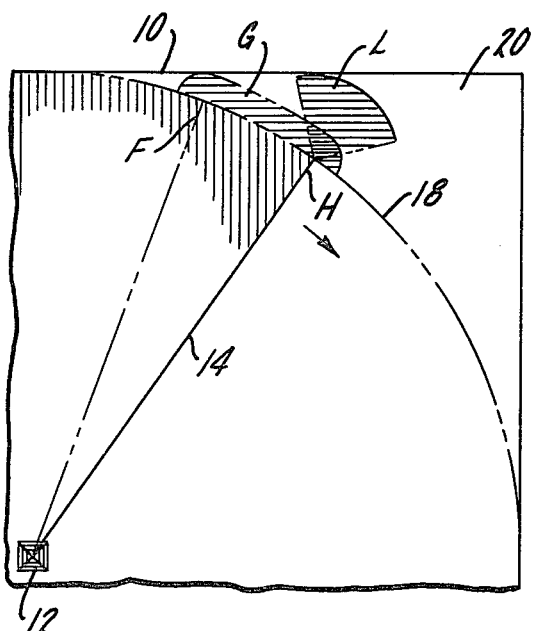
Figure 10:
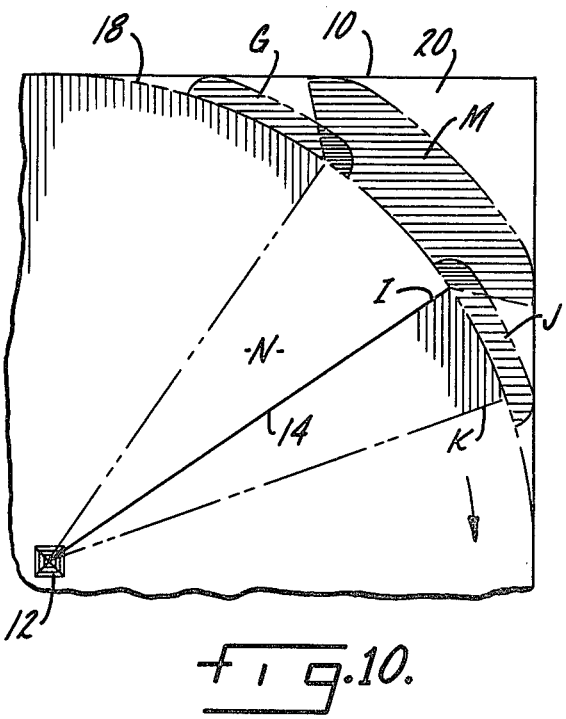

After thirty minutes, or whatever time period is used, the control system turns off corner gun 24, turns on the regular sprinklers 22 and the end guns 28, and reverses movement of the towers so that the pipeline moves back through the corner, as shown in FIG. 5, back to the A position at an accelerated rate of speed, for example twice the normal speed of the system. During this reverse pass, the regular sprinklers will be operating and the corner gun will not. Thus the area D within the circle will be irrigated but at one half the normal or desired rate since the system may be moving at twice its normal rate of speed. When the pipeline gets back to point A, the machine reverses direction again and starts a third pass, in a clockwise direction back past the corner, as shown in FIG. 6. During this third pass, the normal sprinklers 22 and end gun 28 are operating, the corner gun 24 is not operating, and the towers are moving at an accelerated rate of speed, say twice the normal rate of speed, so that the area in the circle has a full or normal water supply, as indicated by shading E. When the unit reaches point B again, the machine slows down to its normal rate of speed and continues past the side of the field in what may be considered normal operation, with the sprinklers 22 operating and the normal end guns 28 either operating or not, as desired. When the machine arrives at the next corner, it may go through the same cycle, a first pass from point A to point B at normal speed with only the volume or corner gun operating and dwell periods at each end, a reverse pass at an accelerated rate of speed with only the regular sprinklers and possibly the regular end guns operating, and a third pass in the normal direction at an accelerated rate of speed with only the normal sprinklers operating. Full or relatively constant water pressure is supplied at all times, which is important.

In FIGS. 7–10 a variant form of operation is shown in which, as compared to the FIGS. 3–6 form, might be considered semiautomatic. Again the unit is considered to be operating clockwise, although it might be counterclockwise. The center pivot 14, when it arrives at a given point F, may be considered to be entering the corner 20. At this point the end gun or guns 28, for a certain length of time irrigate a segment G of the corner. At an intermediate point H, the end guns 28 turn off. From F-H the normal sprinklers 22 on the center pivot are operating. After point H, the center pivot continues its movement with the sprinklers 22 operating and the end gun 28 turned off until it arrives at a second intermediate point I, shown in FIG. 8, where the end gun or guns 28 come on. Thereafter for a certain period of movement the end guns 28 are on to irrigate a segment J to a final point K, where the end guns 28 turn off. During the movement from I-K where the segment J is being irrigated by the end guns 28, the normal sprinklers 22 are on so that the area inside of the circle is also being irrigated. From point K on the normal sprinklers 22 will be operating, but the end guns 28 will be turned off until the unit arrives at a beginning point F in the next corner and then the sequence F-K set forth above will be repeated.

The above would be considered normal operation. When the owner wants to irrigate a maximum amount of the corner, operation of the unit would be altered, for example by a switch control, so that the corner gun 24 will operate, as shown in FIGS. 9 and 10 where, again, the motion of the unit is assumed to be clockwise. As before, the normal end gun 28 comes on at a point F and shuts off at a point H. During movement from F to H, the procedure is the same as in FIG. 7, meaning that the normal end gun 28 and the sprinklers 22 on the center pivot are operating. But at point H, the corner or enlarged gun 24 comes on and the sprinklers 22 on the center pivot, as well as the end gun 28, are turned off so that the full water pressure and volume is applied to gun 28 creating an enlarged pattern L in FIG. 9. Thereafter the center pivot continues its clockwise movement, which may be at its normal rate of speed, until it arrives at point I which may correspond to the point I in FIG. 8. During movement from H to I, the enlarged gun 24 may operate in the manner as explained in connection with FIGS. 3 through 6 to create a deep pattern M in FIG. 10. At point I the enlarged gun 24 is turned off and the regular sprinklers 22 on the center pivot as well as the normal end gun 28 come on to create the regular irrigation pattern within the circle as well as the segment J, like in FIG. 8. After point K, the regular sprinklers 22 stay on and the end gun 28 goes off which may be the same as the operation explained in connection with FIGS. 7 and 8.

The use, operation and function of the invention are as follows:

The invention may be considered to be or include the use or operation, as well as the structure of a center pivot irrigation system which has an enlarged gun on the end thereof constructed and arranged to project water beyond the normal end pattern of such a system by a distance of, say, 150 ft. or thereabouts. The arrangement or system also includes a control, the details of which may be conventional, for turning various sprinklers off and on, for activating the enlarged gun from time to time, and for moving the center pivot back and forth in a certain manner at various speeds to accomplish certain results.

In the arrangement shown, the center pivot unit will be moving normally as it goes past the side of a field in FIG. 2 until it reaches a certain selected point A where it may be considered to be entering the corner. The unit stops, the regular sprinklers are deactivated, and the enlarged gun comes on. The unit is stationary while the corner gun sweeps for a certain period of time, for example thirty minutes. Then the pipe string starts up again and moves through the corner to a second selected point B which may be considered to be at or near the end of the corner. This may be considered the first pass and during this movement the regular sprinklers are deenergized and the enlarged gun is operating so that a substantial part of the corner is irrigated. At the exit point B, the unit stops and the enlarged gun sweeps through a certain pattern with the regular sprinklers still deenergized. After a certain period of time, say thirty minutes, the pipe string reverses direction and moves back through the corner, from point B to point A, at an increased rate of speed. During this second or reverse pass, the normal sprinklers are operated and the enlarged gun is turned off. When the string gets back to the entrance point A, the unit reverses direction and goes back through the corner, again at the increased rate of speed, with the regular sprinklers operating and the enlarged gun off. When the unit gets back to the exit point B, it slows down to its regular speed and moves past the next side of the field with the normal sprinklers operating in their regular manner and the enlarged gun deenergized. The unit thus makes three passes by the corner, the first one in a forward direction with the enlarged gun operating and the normal sprinklers shut down, the second in a reverse direction at an increased rate of speed with the enlarged gun shut down and the regular sprinklers operating, and the third in the forward direction at the increased rate of speed with the regular sprinklers operating and the enlarged gun shut down. During any one or all of these three passes, the normal end guns, which have a rather limited trajectory beyond the end of the pipeline, may be turned off or on at any suitable time or any portion of a pass as desired.

It will be noted that during the second and third passes, the unit is moving at an accelerated speed. The object of this is so that the particular segment of the circle covered by the center pivot will not be overwatered. During these passes, the regular sprinklers will be delivering water at their regular rate and if both of these passes were at the normal speed of the mechanism, the segment would receive double the amount of water desired.

Whereas it has been stated that the method and apparatus is controlled from a cam arrangement at the center pivot through microswitches, it should be understood that it may be done in any suitable manner. For example, a post or certain actuators may be positioned at or adjacent the points A and B to engage a trip wire or actuator on the center pivot in any suitable manner. In short, the precise position and structure of the control is not considered important in detail.

Under certain circumstances, it might be advisable to have the enlarged gun operating both during the first and second passes with the unit moving at an accelerated rate of speed, so that the corner will not be overwatered. And only during the third pass would the enlarged gun shut down and the regular sprinklers come on with the center pivot unit slowing down to its normal rate of travel. But the first described procedure is preferred.

While it has been stated that the regular sprinklers are shut down when the enlarged gun is operating so that full water pressure will be supplied to the enlarged gun, under certain circustomstances it may be desirable to mount a booster unit on the outermost tower, for example, such as a pump driven by a gasoline engine or an electric motor, to boost the pressure at the enlarged gun to increase its throw. But this is an option and may well depend upon the application. Also, the towers have been shown as mounted on wheels and it should be understood that treads or walking units might be used. Also, the towers could be electrically operated or water-driven, as desired. The precise details and structures of the towers, the arches or spans, and center pivot itself are not considered important in and of themselves.

In the method of operation shown and explained in connection with FIGS. 7-10, it will be realized that as compared to the FIGS. 3-6 form the unit is semiautomatic. This means that the unit would normally operate in accordance with FIGS. 7 and 8. And when the owner considered that the corners should be irrigated, he would alter the operation of the unit, say, for several days or several revolutions, so that the pattern M would be created in each corner and the segment between the center pivot and the corner, designated N in FIG. 10, would not be irrigated. After a selected number of revolutions or days, the owner would change the setting again so that it would resume the FIGS. 7 and 8 operation, which may be considered standard.

The specific details of the controls for any of the described mode of operation may involve standard components, none of which has been shown in detail. The arrangment and method of operation in FIGS. 3 through 6 may be considered totally automatic, whereas FIGS. 7 through 10 might be viewed as semiautomatic. In FIGS. 7-10 the machine travels at normal speed most of the time and there is no necessary variation in the movement of the center pivot unit itself. But during the operation of the enlarged gun, in the area M, it may be desirable to change the rate of travel of the center pivot, from point H to point I. Switching from automatic, as in FIGS. 7 and 8, to corner watering, as in FIGS. 9 and 10, may be done manually or by a remote control, either at the center pivot itself or elsewhere. Using the enlarged gun may be most advantageously left to the judgment of the user, since it may be desirable to operate it only on quiet days when wind is not a factor. Also, the order of the passes in the FIGS. 3-6 form may be varied.

Whereas the preferred form and several variations of the invention have been shown, described and suggested, it should be understood that suitable additional modifications, changes, substitutions and alterations may be made without departing from the invention's fundamental theme.

The embodiments of the invention in which an exclusive property or privilege is claimed are defined as follows:

1. A method of operating a center pivot irrigation system which is constructed for irrigating a main circular area of a field and noncircular areas outside of the main circular area in which the system includes a string of pipe supported at intervals on movable towers and extending outwardly from and adapted to move around a center pivot with a series of sprinkler units on the pipe string with a normal end gun on the outer end of the pipe string to irrigate limited areas outside of the noncircular area and an enlarged end gun on the outer end of the pipe string directed generally radially outwardly therefrom to irrigate substantially larger portions of the noncircular areas, including the steps of moving the pipe string around the main circular area and operating the series of sprinkler units thereon to irrigate the main circular area in the normal manner, at the same time periodically operating the normal end gun opposite the noncircular areas to irrigate limited areas outside of the main circular area in the noncircular areas, and, from time to time, deenergizing the series of sprinkler units on the pipe string and energizing the enlarged end gun for a certain limited extent of movement of the pipe string opposite a noncircular area so that the full water pressure of the system is applied to the enlarged end gun during such limited extent of movement.

2. The method of claim 1 further characterized by and including the step of operating the normal end gun for a first limited period of time as the system approaches a noncircular area and for a second limited period of time as the system moves away from the noncircular area during the system's normal operation.

3. The method of claim 1 further characterized by and including the step of deenergizing the normal end gun at the same time that the series of sprinkler units are deenergized and the enlarged end gun is energized.

4. The method of claim 1 applied to a square with the circular area being a circle inscribed in the square and the noncircular areas being the corners outside of the circle.

5. A method of operating a center pivot irrigation system to irrigate a generally square field in which the system has a pipe string with sprinklers spaced intermittently thereon constructed and arranged to pivot about a center water supply and having an enlarged corner gun on the outer end thereof for irrigating areas of the field outside of the circle described by the system, for example, the corners of the field, including the steps of moving the pipe string at a generally uniform rate and operating the sprinklers but not the enlarged corner gun when the pipe string is opposite the sides of the field, stopping the movement of the pipe string a number of times when it is opposite a corner, deenergizing the sprinklers while the pipe string is stopped and supplying virtually all the water to the enlarged corner gun, energizing the enlarged corner gun when the pipe string is stopped opposite a corner, and traversing the corner gun through a substantial arc in the corner of the field when it is energized and the pipe string is stopped to thereby irrigate a substantial pattern in the corner when the pipe string is stopped.

6. A method of operating a center pivot irrigation system which is constructed for irrigating a main circular area of a field and certain non-circular areas outside of the main circular area in which the system includes a string of pipe supported at intervals on movable towers and extending outwardly from and adapted to move about the center pivot with a series of sprinkler units on the pipe string and an enlarged corner gun of substantial capacity and trajectory on the outer end of the pipe string directed generally radially outwardly therefrom to irrigate the non-circular areas, including the steps of moving the pipe string in a normal circular motion at a generally uniform rate around the field with the series of sprinkler units operating and the enlarged corner gun not operating to irrigate the circular area, from time to time stopping both the movement of the pipe string and the operation of the series of sprinkler units and operating the enlarged corner gun a plurality of times in different radial positions opposite a non-circular area so that the full water pressure of the system will be supplied to the enlarged corner gun to irrigate the non-circular area and the circular area opposite the non-circular area will not be irrigated during such operation of the enlarged corner gun, and traversing the enlarged corner gun through a substantial arc in the corner of the field each time the pipe string is stopped so as to irrigate a substantial pattern in the corner.

7. The method of claim 6 further characterized in that the system includes a normal end gun of less capacity and trajectory than the enlarged corner gun also positioned on the outer end of the pipe string, and further including the steps of operating the normal end gun at the same time that the pipe string is moving and the series of sprinklers are operating, and not operating the normal end gun when the enlarged corner gun is operating.

8. The method of claim 7 further characterized by and including the steps of initially stopping movement of the pipe string at the beginning of an outside non-circular area, operating the enlarged corner gun and not operating the sprinkler units and the normal end gun while holding the pipe string stationary for a certain period of time, thereafter moving the pipe string past the non-circular area, stopping the movement of the pipe string at the end of the non-circular area, holding the pipe string stationary and sweeping the enlarged corner gun across a certain arc covering a part of the non-circular area for a certain period of time at the end of the non-circular area, and operating the enlarged corner gun for at least part of the time between the beginning and end of the non-circular area.

9. The method of claim 8 further characterized by and including the step of moving the pipe string at a generally uniform rate between the beginning and end of the non-circular area.

10. The method of claim 8 further characterized by and including the step of generally continuously operating the enlarged corner gun while the pipe string is moving between the beginning and end of the non-circular area.

11. The method of claim 10 further characterized by and including the step of generally continuously sweeping the enlarged corner gun across a certain arc covering a part of the non-circular area while the pipe string is moving between the beginning and end of the non-circular area.

* * * * *